United States Patent
Im et al.

(10) Patent No.: US 10,318,452 B2
(45) Date of Patent: Jun. 11, 2019

(54) PROCESSOR AND CONTROLLING METHOD THEREOF TO PROCESS AN INTERRUPT

(71) Applicant: SAMSUNG ELECTRONICS CO., LTD., Suwon-si (KR)

(72) Inventors: Chae-seok Im, Yongin-si (KR); Dong-kwan Suh, Yongin-si (KR); Suk-jin Kim, Seoul (KR); Seung-won Lee, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 467 days.

(21) Appl. No.: 15/136,183

(22) Filed: Apr. 22, 2016

(65) Prior Publication Data

US 2017/0161217 A1   Jun. 8, 2017

(30) Foreign Application Priority Data

Dec. 4, 2015   (KR) .................. 10-2015-0172093

(51) Int. Cl.
*G06F 13/24* (2006.01)
*G06F 9/30* (2018.01)
(Continued)

(52) U.S. Cl.
CPC .......... *G06F 13/24* (2013.01); *G06F 9/30043* (2013.01); *G06F 9/30123* (2013.01);
(Continued)

(58) Field of Classification Search
None
See application file for complete search history.

(56) References Cited

U.S. PATENT DOCUMENTS 5,640,570 A * 6/1997 St. Clair ................. G06F 13/24
710/260
5,642,516 A * 6/1997 Hedayat .................. G06F 13/26
710/260

(Continued)

FOREIGN PATENT DOCUMENTS

KR         10-0498469 B1    7/2005
KR    10-2009-0042283 A    4/2009

OTHER PUBLICATIONS

'How do the registers get saved when a process gets interrupted?' from stackoverflow.com, Jun. 13, 2011. (Year: 2011).*

(Continued)

*Primary Examiner* — Steven G Snyder
(74) *Attorney, Agent, or Firm* — Staas & Halsey LLP (57) ABSTRACT

A processor and a control method thereof are processed. The processor includes an instruction fetch module configured to receive a first instruction of an interrupt service routine without backup of data stored in a register in response to processing of the interrupt service routine being requested, a detecting module configured to analyze the received first instruction to determine whether the data stored in the register needs to be changed, an instruction generating module configured to generate a second instruction for storing data in a temporary memory when the stored data is initially changed, an instruction selecting module configured to sequentially select the generated second instruction and first instruction; and a control module configured to perform the second instruction and the first instruction.

15 Claims, 6 Drawing Sheets

(51) Int. Cl.
*G06F 9/38* (2018.01)
*G06F 9/48* (2006.01)
*G06F 9/46* (2006.01)

(52) U.S. Cl.
CPC ............ *G06F 9/3861* (2013.01); *G06F 9/462* (2013.01); *G06F 9/4812* (2013.01)

(56) References Cited

U.S. PATENT DOCUMENTS

| | | | | |
|---|---|---|---|---|
| 5,687,381 | A * | 11/1997 | Swanstrom | G06F 13/24 710/269 |
| 5,727,227 | A * | 3/1998 | Schmidt | G06F 9/3879 710/260 |
| 5,944,816 | A * | 8/1999 | Dutton | G06F 9/3851 710/266 |
| 5,948,093 | A * | 9/1999 | Swanstrom | G06F 9/4812 710/264 |
| 5,987,258 | A | 11/1999 | Daniel et al. | |
| 6,044,430 | A * | 3/2000 | MacDonald | G06F 9/4812 710/260 |
| 6,205,467 | B1 * | 3/2001 | Lambrecht | G06F 9/3863 712/E9.061 |
| 6,205,543 | B1 * | 3/2001 | Tremblay | G06F 9/30043 712/228 |
| 6,378,023 | B1 * | 4/2002 | Christie | G06F 12/0875 710/260 |
| 6,487,654 | B2 * | 11/2002 | Dowling | G06F 9/462 710/260 |
| 6,799,269 | B2 * | 9/2004 | Dowling | G06F 9/462 712/244 |
| 6,981,133 | B1 | 12/2005 | Donovan | |
| 7,681,022 | B2 | 3/2010 | Sartorius et al. | |
| 7,752,368 | B2 | 7/2010 | Park | |
| 7,865,706 | B2 * | 1/2011 | Ichinose | G06F 9/4812 712/244 |
| 7,882,293 | B2 * | 2/2011 | Burdass | G06F 13/24 710/244 |
| 8,635,627 | B2 * | 1/2014 | Park | G06F 9/461 712/228 |
| 2002/0002648 | A1 * | 1/2002 | Kawase | G06F 13/26 710/260 |
| 2002/0052993 | A1 * | 5/2002 | Dowling | G06F 9/462 710/260 |
| 2003/0149864 | A1 * | 8/2003 | Furukawa | G06F 9/3851 712/228 |
| 2005/0138257 | A1 * | 6/2005 | Burdass | G06F 13/24 710/262 |
| 2007/0266230 | A1 * | 11/2007 | Ichinose | G06F 9/30134 712/244 |
| 2014/0372651 | A1 * | 12/2014 | Kanai | G06F 9/462 710/261 |

OTHER PUBLICATIONS

'Chapter 12: Interrupts' by Jonathan Valvano and Ramesh Yerraballi, from 'Embedded Systems: Introduction to ARM Cortex-M Microcontrollers,' 2014. (Year: 2014).*

'How to Minimize Interrupt Service Routine (ISR) Overhead' by Nigel Jones, Embedded Systems Programming, Jan. 2007. (Year: 2007).*

'A Mechanism for Efficient Context Switching' by Nuth and Dally, IEEE, 1991. (Year: 1991).*

* cited by examiner

PROCESSOR AND CONTROLLING METHOD THEREOF TO PROCESS AN INTERRUPT

CROSS-REFERENCE TO RELATED APPLICATIONS

This application claims priority from Korean Patent Application No. 10-2015-0172093, filed on Dec. 4, 2015, in the Korean Intellectual Property Office, the disclosure of which is incorporated herein by reference in its entirety.

BACKGROUND OF THE INVENTION

Field of the Invention

Apparatuses and methods consistent with the present invention relate to a processor and a control method thereof, and more particularly, to a processor and a control method thereof, for processing an interrupt service.

Description of the Related Art

An electronic apparatus executes an application program to perform a specific function. The application program is a service routine containing consecutive instructions, and a processor of an electronic apparatus processes consecutive instructions. The processor sequentially processes consecutive instructions. However, the application program may include an interrupt service routine as necessary. The interrupt service routine may be executed according to generation of an event that is set during processing of a main service routine. When interrupt occurs, the processor stops processing of the main service routine and processes the interrupt service routine. The processor needs to use a register in the processor in order to process the interrupt service routine. However, the processor may now know a register to be used at a time point when the interrupt service routine is started. Accordingly, the processor stores data stored in all registers in a memory and then processes the interrupt service routine. In addition, when the interrupt service routine is terminated, the processor restores data stored in the memory back to all registers. Accordingly, a long period of time is taken to process the interrupt service routine.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a processor and control method for reducing processing time of an interrupt service routine.

According to an aspect of the present invention, a processor includes an instruction fetch module configured to receive a first instruction of an interrupt service routine without backup of data stored in a register in response to processing of the interrupt service routine being requested, a detecting module configured to analyze the received first instruction to determine whether the data stored in the register needs to be changed, an instruction generating module configured to generate a second instruction for storing data in a temporary memory when the stored data is initially changed, an instruction selecting module configured to sequentially select the generated second instruction and first instruction, and a control module configured to perform the second instruction and the first instruction.

The control module may store the data in the temporary memory and then performs the first instruction.

The control module may restore the data stored in the temporary memory to the register in response to the interrupt service routine being terminated.

The detecting module may change a value of a register flag when the value of the register flag is initialized and the stored data is initially changed in response to processing of the interrupt service routine containing the register flag being requested.

The detecting module may determine that the stored data is changed when the value of the register flag is changed.

A plurality of registers may be present.

The control module may restore only data corresponding to a register, a value of a register flag of which is changed, among the plurality of registers from the temporary memory.

The instruction generating module may not generate the second instruction when the data stored in the register is not changed or is not initially changed.

According to another aspect of the present invention, a controlling method of a processor includes receiving a first instruction of an interrupt service routine without backup of data stored in a register in response to processing of the interrupt service routine being requested, analyzing the received first instruction to determine whether the data stored in the register needs to be changed, generating a second instruction for storing data in a temporary memory when the stored data is initially changed, sequentially selecting the generated second instruction and first instruction, and performing the second instruction and the first instruction.

The performing may include storing the data in the temporary memory and then performing the first instruction.

The method may further include restoring the data stored in the temporary memory to the register in response to the interrupt service routine being terminated.

The determining may include changing a value of a register flag when the value of the register flag is initialized and the stored data is initially changed in response to processing of the interrupt service routine containing the register flag being requested.

The determining may include determining that the stored data is changed when the value of the register flag is changed.

A plurality of registers may be present, and the restoring may include restoring the control module restores only data corresponding to a register, a value of a register flag of which is changed, among the plurality of registers from the temporary memory.

The generating may include not generating the second instruction when the data stored in the register is not changed or is not initially changed.

According to the diverse exemplary embodiments of the present invention, a processor and a control method thereof may reduce processing time of an interrupt service routine so as to enhance performance of the processor.

Additional and/or other aspects and advantages of the invention will be set forth in part in the description which follows and, in part, will be obvious from the description, or may be learned by practice of the invention.

BRIEF DESCRIPTION OF THE DRAWING FIGURES

The above and/or other aspects of the present invention will be more apparent by describing certain exemplary embodiments of the present invention with reference to the accompanying drawings, in which.

DETAILED DESCRIPTION OF THE EXEMPLARY EMBODIMENTS

Certain exemplary embodiments of the present invention will now be described in greater detail with reference to the accompanying drawings. Embodiments stated in the disclosure may be changed in various ways. A specific embodiment may be shown in the drawings and described in detail in the detailed description. However, the accompanying drawings have been made only for a better understanding of various embodiments disclosed herein and are not intended to limit technical ideas disclosed herein, and it should be understood that the accompanying drawings are intended to encompass all modifications, equivalents and substitutions included in the spirit and scope of the present invention. In the following description of the present invention, a detailed description of known functions and configurations incorporated herein will be omitted or simplified when it may make the subject matter of the present invention unclear.

The terms including "first", "second", etc. may be used to describe various elements, but the elements are not limited by the terms. The terms, if any, are used for distinguishing between one element and other elements.

In this disclosure, it will be further understood that the terms "comprises" or "comprising" when used in this specification, specify the presence of stated features, integers, steps, operations, elements, or components, but do not preclude the presence or addition of one or more other features, integers, steps, operations, elements, components, or groups thereof. It will be understood that when an element is referred to as being "connected to" or "coupled to" another element, it may be directly on, connected or coupled to the other element or intervening elements may be present. In contrast, when an element is referred to as being "directly on," "directly connected to" or "directly coupled to" another element or layer, there are no intervening elements or layers present.

The term "module" or "unit" of a component used in the disclosure performs at least one function or operation. In addition, the "module" or the "unit" should be understood as performing a function or an operation in a hardware manner, a software manner, or a combination of the hardware manner and the software manner. Moreover, a plurality of "modules" or a plurality of "units" except for a "module" or "unit" that is embodied in specific hardware or embodied in at least one processor may be integrated into at least one module.

The singular forms are intended to include the plural forms as well, unless the context clearly indicates otherwise.

Figure 1:
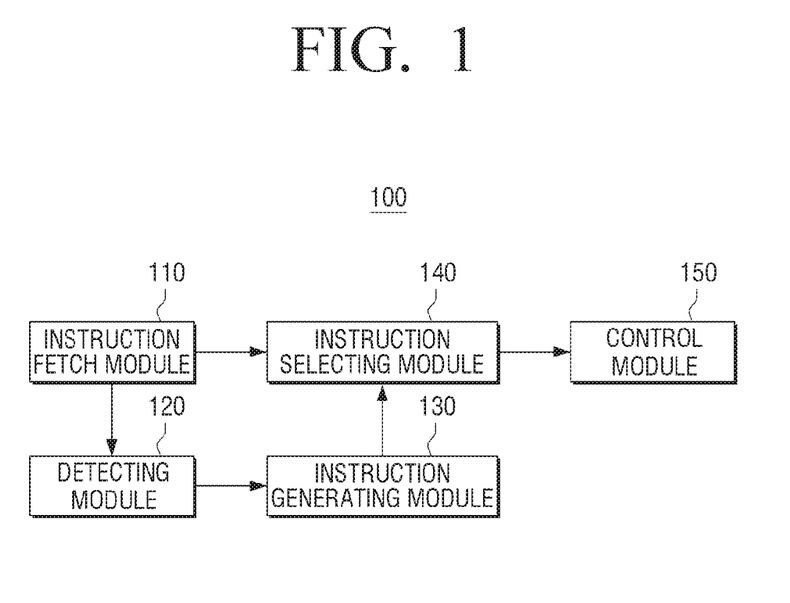
FIG. 1 is a block diagram of a processor according to an exemplary embodiment of the present invention.

FIG. 1 is a block diagram of a processor 100 according to an exemplary embodiment of the present invention.

Referring to FIG. 1, the processor 100 may include an instruction fetch module 110, a detecting module 120, an instruction generating module 130, an instruction selecting module 140, and a control module 150. In response to an interrupt service routine (ISR) being requested to be processed, the instruction fetch module 110 may receive a first instruction of the ISR without backup of data stored in a register. The ISR may be executed when an interrupt event occurs. In general, the processor 100 executes an application program. The application program may include a main service routine. The processor 100 may sequentially process the instruction included in the main service routine. While the processor 100 executes the main service routine, an interrupt event may occur in an external apparatus (not shown). For example, the external apparatus may include a disk, a keyboard, a printer, a display apparatus, and so on. When the interrupt event occurs, the processor 100 may temporally stop the main service routine that is being processed and may execute an ISR corresponding to the generated interrupt.

In the case of a prior art, prior to execution of an ISR, a processor backs up data of a register in a temporary memory. For example, the temporary memory may be a stack. During execution of the ISR, the processor needs to write data in a register while processing an instruction included in the ISR. Accordingly, in order to retain data written in a register while executing a main service routine, the processor backs up the data of the register to the temporary memory prior to execution of the ISR. The processor does not know a register to be used during execution of the ISR, and thus backs up data stored in all registers to the temporary memory. Accordingly, in the case of the prior art, a long period of time is taken before the processor processes the ISR.

However, the processor 100 according to embodiments of the present invention may not back up data stored in a register to a temporary memory prior to execution of an ISR. Accordingly, the processor 100 according to the embodiments of the present invention may save time to back up data of the register. When the ISR is executed, the processor 100 may receive an instruction of the ISR. That is, in response to a request to process the ISR, the instruction fetch module 110 inside the processor 100 may receive an instruction of the ISR without back up of the data registered in the register.

The detecting module 120 may analyze an input first instruction to determine whether data stored in a register needs to be changed. As described above, the processor 100 according to the embodiments of the present invention may not back up the data stored in the register prior to execution of the ISR. However, the processor 100 needs to write data in the register while processing the ISR. Accordingly, the detecting module 120 may determine whether a register needs to be used to process a first instruction input to the instruction fetch module 110. When the register needs to be used, the processor 100 may back up the data stored in the register to be used to the temporary memory and process the input first instruction. In addition, when the register is not necessarily use the register, the processor 100 may process the input first instruction without back up of data. A detailed process of analyzing an instruction input to the detecting module 120 will be described in detail.

When the stored data is initially changed, the instruction generating module 130 may generate a second instruction for storing data stored in the register, in the temporary memory. The second instruction may be a storing instruction. When the processor 100 needs to use a register in order to process an instruction, the processor 100 needs to back up the data stored in the register. The processor 100 may perform a function of processing an input instruction. The processor 100 may perform a data backup function only in response to a data backup instruction being received. However, the data backup instruction is not included in the ISR, and thus the instruction generating module 130 may generate the data backup instruction. That is, the data backup instruction may be a storing instruction for storing data in the temporary memory. The processor 100 may first execute the storing instruction generated by the instruction generating module 130 in the processor 100 so as to store the data of the resister in the temporary memory. In addition, the processor 100 may process the first instruction input to the instruction fetch module 110.

The data of the register, which needs to be backed up before the processor 100 processes the first instruction of the ISR, may be data that is stored in the register during execution of the main service routine. Accordingly, it is sufficient that the processor 100 backs up the data stored in the register while executing the main service routine. Instructions included in the ISR may be formed so as to execute the ISR. For example, when first data that is stored in a register during processing of a first instruction of the ISR needs to be used in a subsequently processed instruction, the ISR may be formed so as to store second data that is stored in a register during processing of a second instruction in another register. This means that, when the ISR is formed to overwrite the first data with the second data (that is, when the second data is stored in the same register as that of the first data), the first data is not required any longer. Accordingly, the instruction generating module 130 may backs up data only when data stored in a register is initially changed.

When the register is not necessarily used, the instruction generating module 130 may not generate a second instruction. In addition, the processor 100 may process only the input first instruction.

The instruction selecting module 140 may sequentially select the generated second instruction and the input first instruction. For example, the generated second instruction may be a storing instruction for restoring data stored in a register in a temporary memory. In addition, the first instruction may be an arithmetic and logical instruction such as the four fundamental arithmetic operations or comparison. When a register is used, the processor 100 needs to first backup data stored in the register in the temporary memory. Accordingly, the instruction selecting module 140 may first select the second instruction and output the second instruction to the control module 150 so as to first process the second instruction, and then, may output the first instruction.

When a register is not necessarily used, the instruction selecting module 140 may output the input first instruction to the control module 150.

The control module 150 may process the second instruction and first instruction input from the instruction selecting module 140. The instruction selecting module 140 first outputs the second instruction, and thus the control module 150 may also first process the second instruction. That is, the processor 100 may first backup data registered in the register to the temporary memory. Then, the instruction selecting module 140 outputs the first instruction, and thus the control module 150 may also process the first instruction after the second instruction. That is, the processor 100 may backup data of a register and then process an arithmetic or logical instruction. Accordingly, the processor 100 may process an instruction of the ISR while backing up data required in the main service routine. In addition, the processor 100 does not collectively backup data of the register prior to execution of the ISR, and thus processing time of the ISR may be reduced.

When a register is not necessarily used, the second instruction is not generated, and thus the control module 150 may process only the input first instruction.

Figure 2:
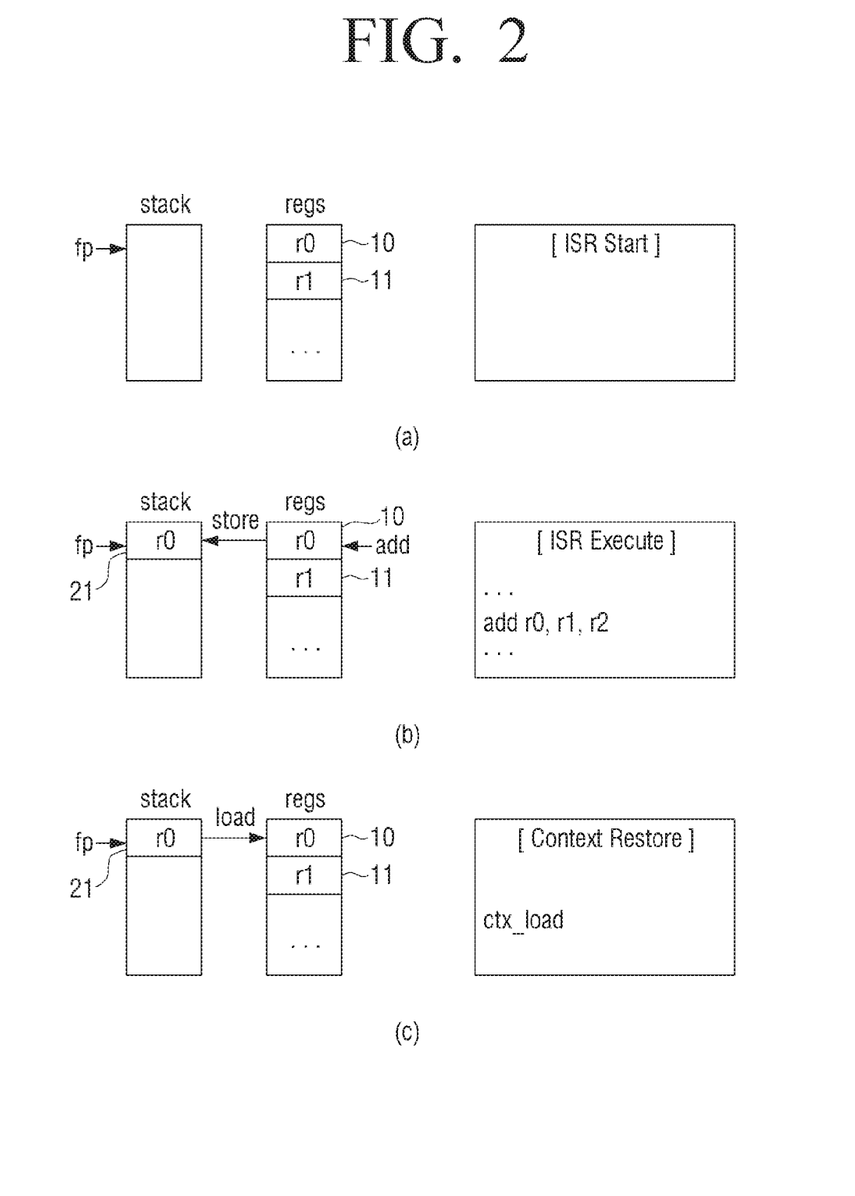
FIG. 2 is a diagram for explanation of a procedure for processing an interrupt service routine (ISR) according to an exemplary embodiment of the present invention.

FIG. 2 is a diagram for explanation of a procedure for processing an ISR according to an exemplary embodiment of the present invention.

FIG. 2(A) illustrates a temporary memory and a register at a time point when an ISR is started. As described above, the temporary memory may be a stack. In addition, a plurality of registers may be present. According to an exemplary embodiment of the present invention, a processor may include several tens of registers or include several hundreds of registers. The processor may include various numbers of registers according to uses, performances, sizes, or the like. Referring to FIG. 2(A), the register may store data that is stored during execution of the main service routine. For example, a $0^{th}$ register 10 may store r0 data and a first register 11 may store r1 data. The stack may include a frame pointer fp. During storing of data of a register in the stack, the processor may determine an address of a stack for storing data by summing the fp and an offset of the register.

When an interrupt event occurs, in response to interrupt service execution being requested, the processor may execute the ISR. During execution of the ISR, the processor may not store the data of the register in the stack. In addition, the processor may receive an instruction of the ISR.

FIG. 2(B) illustrates a procedure for processing an instruction of an ISR. The processor may receive the instruction of the ISR. For example, the instruction of the ISR may be a sum instruction. The processor may analyze an input instruction. According to an exemplary embodiment of the present invention, the sum instruction may be an instruction written in the $0^{th}$ register 10 by summing of data of the first register 11 and data of a second register (not shown). The processor needs to use the $0^{th}$ register 10, and thus r0 data stored in the $0^{th}$ register 10 needs to be backed up. The processor may generate an instruction for storing the data of the $0^{th}$ register 10 in the stack. The processor may previously process the storing instruction compared with the sum instruction of the ISR. When the storing instruction is processed, the r0 data of the $0^{th}$ register 10 may be stored in a designated region 21 of the stack. The processor may process the sum instruction after backing up the r0 data. The processor may process the instruction of the ISR in the same way.

FIG. 2(C) illustrates a procedure for restoring data of the stack to the register. In response to all instructions of ISRs being processed, the processor may re-process an instruction of a main service routine. The processor may restore the data stored in the stack to the register prior to processing the instruction of the main service routine. According to an exemplary embodiment of the present invention, the restoring instruction restored to the register may be arbitrarily set. A designer may use an existing load instruction or may newly generate and set an instruction (e.g., ctx_load) to be restored to the register. In response to the ISR being terminated, the processor may process the restoring instruction. The processor may memorize an address of the stack to which data is backed up, and in response to the ISR being terminated, the processor may restore the data of the memorized address of the stack to an original register. According to an exemplary embodiment of the present invention, the processor may restore the r0 data stored in the designated region 21 of the stack to the first register 11. In response to the data backup to the stack being restored to the register, the processor may terminate the ISR and execute the ISR at a time point when the main service routine is stopped.

Figure 3:
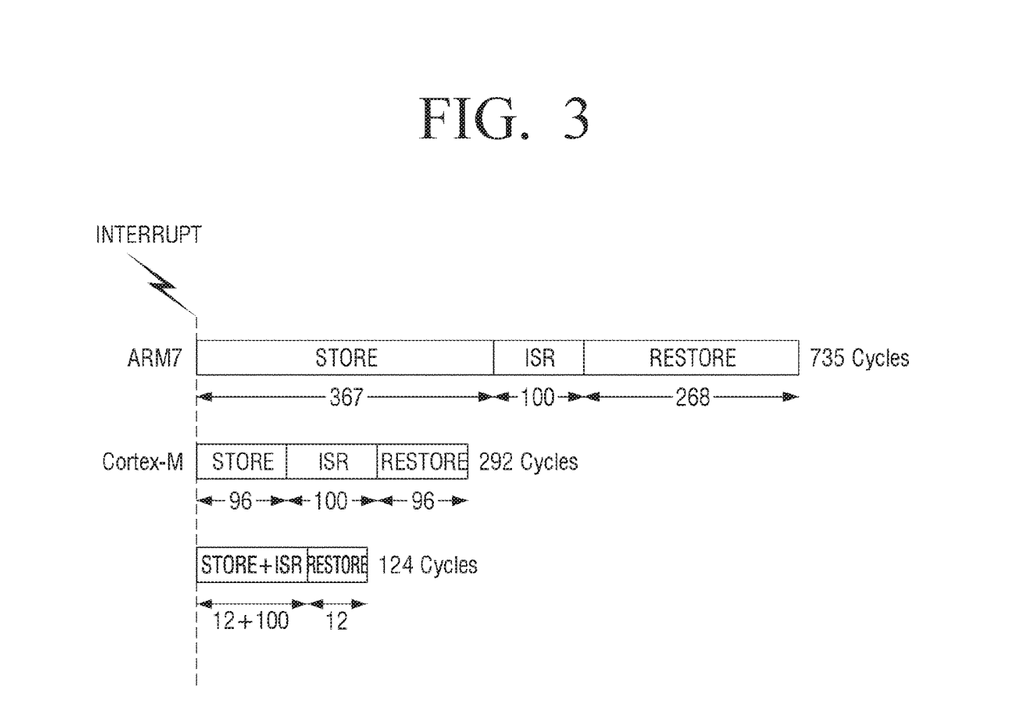
FIG. 3 is a diagram for velocity comparison between different processor cores for processing the same ISR.

FIG. 3 is a diagram for velocity comparison between different processor cores for processing the same ISR.

FIG. 3 is a diagram for comparison of performance of various processors for processing an ISR related to a DTV service. According to an exemplary embodiment of the present invention, the number of ISRs related to the DTV service may be 36.

First, an example in which an ARM7 processor executes one ISR will be described. In response to an interrupt request being received, the ARM7 processor may backup data stored in the register to the stack. It takes time of 367 cycles to backup data by the ARM7 processor. In addition, it takes time of 100 cycles to execute the ISR by the ARM7 processor. Lastly, it takes time of 268 cycles to terminate the ISR and to restore data to the register by the ARM7 processor. That is, the ARM7 processor requires time of 735 cycles in order to execute one ISR.

Next, an example in which a cortex-M processor executes one ISR. In response to an interrupt request being received, the cortex-M processor may also backup data stored in the register to the stack. It takes time of 96 cycles to backup data by the cortex-M processor. In addition, it takes time of 100 cycles to execute the ISR by the cortex-M processor. It takes time of 96 cycles to restore backed up data to the resister by the cortex-M processor. That is, time of 292 cycles is required to execute one ISR by the cortex-M processor.

Lastly, an example in which a processor according to the present invention executes one ISR will be described. The processor may no back up data stored in a register to a stack even if the processor receives an interrupt request. Accordingly, time to backup data by the processor is not required. Instead, the processor may backup data of the required register to the stack during execution of the ISR. Accordingly, it takes time of 112 cycles to execute the ISR by the processor. It takes time of 12 cycles to terminate the ISR and restore backed up data to the register by the processor. That is, time of 123 cycles is required to execute one ISR by the processor according to the present invention.

As described above, the number of ISRs related to a DTV service may be 36. Accordingly, it takes time of 735 cycles to execute one ISR by the ARM7 processor, and thus it takes time of 26460 cycles to execute all ISRs related to the DTV service. It takes time of 292 cycles to execute one ISR by the cortex-M processor, and thus it takes time of 10512 cycles to execute all ISRs related to the DTV service. It takes time of 124 cycles to execute one ISR by the processor according to the present invention, and thus it takes of 4464 cycles to execute all ISRs related to the DTV service. Accordingly, the processor according to the present invention may perform 5.9 times more rapid processing than the ARM7 processor and perform 2.4 times more rapid processing than the cortex-M processor.

Figure 4:
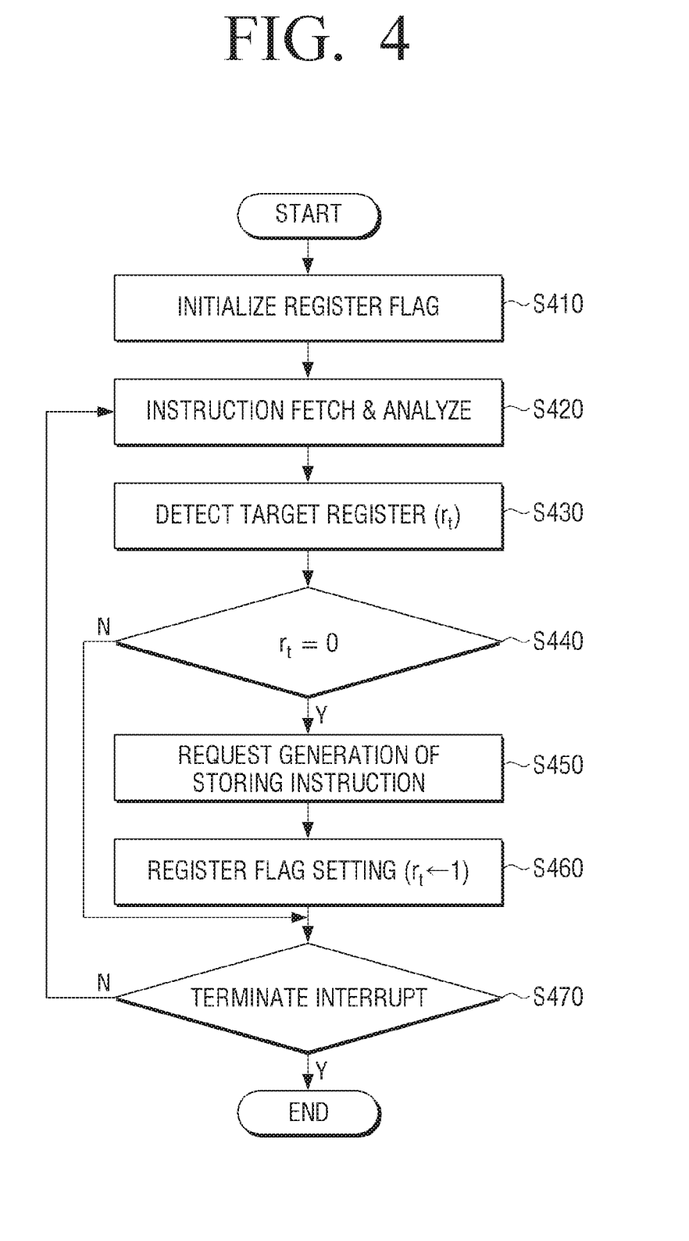
FIG. 4 is a flowchart for explanation of a procedure for analyzing an instruction according to an exemplary embodiment of the present invention.

FIG. 4 is a flowchart for explanation of a procedure for analyzing an instruction according to an exemplary embodiment of the present invention.

Referring to FIG. 4, in response to an interrupt request being received, a processor may initialize a register flag (S410). The register flag may be a flag indicating whether data is stored during execution of an ISR. For example, the processor may initialize all values of the register flag to 0. The register flag will be described below. The processor may receive and analyze an instruction (S420). As described above, an instruction fetch module of the processor may receive an instruction. In addition, an instruction detecting module of the processor may analyze an instruction.

The processor may detect a target register rt (S430). The detecting module of the processor may detect the target register rt. The processor may analyze an input instruction. In addition, the processor may determine whether the register needs to be used. When the register needs to be used, the processor may detect a targeted register. The targeted register may be the target register. The processor may check whether a flag value of the target register is 0 (S440). As described above, the processor may back up only stored data to the stack during execution of a main service routine. In response to data of the target register being changed, the processor may set a flag value of the target register to 1. Accordingly, when the flag value of the target register is 0, this may indicate that data of the target register is not changed. When a value of the target register is 0, the processor may request generation of a storing instruction (S450). An instruction generating module of the processor may generate a storing (backup) instruction.

When a value of the target register is not 0, the processor may determine whether the ISR is terminated (S470). When the ISR is not terminated, the processor may receive and analyze a subsequent instruction (S420). In response to the ISR being terminated, the processor may terminate an instruction analyzing procedure.

The processor may set a value of a register flag of the target register to 1 (S460). As described above, when use of the target register is predicated and a flag value of the target register is 0, the processor may backup data of the target register to the stack. In addition, the processor may set the flag value of the target register to 1. The processor may determine whether the ISR is terminated (S470). When the ISR is terminated, the processor may terminate the instruction analyzing procedure.

In response to instruction processing of the ISR being completed, the processor may determine a register with a register flag value set to 1 and restore data of the determined register.

Figure 5:
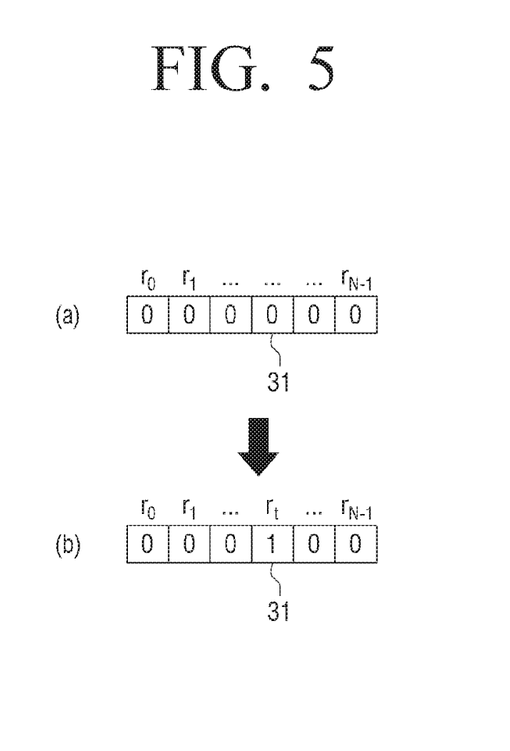
FIG. 5 is a diagram for explanation of a method for displaying a register that backs up data according to an exemplary embodiment of the present invention.

FIG. 5 is a diagram for explanation of a method for displaying a register that backs up data according to an exemplary embodiment of the present invention.

FIG. 5(A) illustrates an initialized register flag. A processor may include a register flag that displays a flag value for each register. In response to the ISR being started, the processor may initialize the register flag value to 0. According to an exemplary embodiment of the present invention, as described with reference to FIG. 4, a flag 31 that is determined by analyzing an instruction may also be initialized and set to a value of 0.

FIG. 5(B) illustrates an example in which a flag value of a target register is set to 1. The processor may determine a target register to be used by analyzing an instruction. The processor may generate a storing (backup) instruction and set a value of the flag 31 of the target register to 1. Even if the value of the flag 31 of the target register is set to 1 and then a subsequent instruction re-accesses the target register, the processor may not store data of the target register to the stack. That is, the processor may change a value of a register flag and store data of the register in the stack only when data stored in the register is initially changed. In addition, when the value of the register flag is changed, the processor may determine that the data stored in the register is changed. Accordingly, when the value of the register flag is not changed, the processor may determine that data of a corresponding register is not changed. That is, when the data stored in the register is not changed or is not initially changed, the processor may not generate a backup instruction. When the ISR is terminated, the processor may determine whether the register flag is changed and restore only data corresponding to the register, a value of the register flag of which is changed, to the register from the stack.

Thus far, the processors according to various exemplary embodiments of the present invention have been described. A control method of a processor will be described below.

Figure 6:
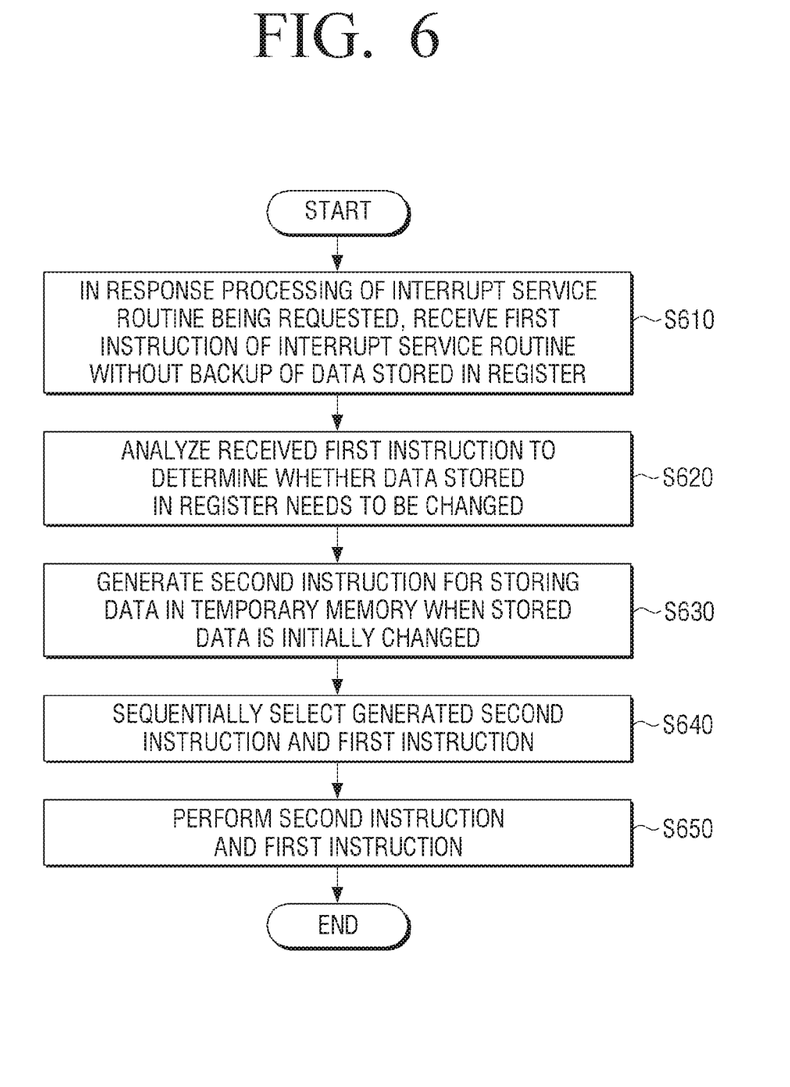
FIG. 6 is a flowchart of a control method of a processor according to an exemplary embodiment of the present invention.

FIG. 6 is a flowchart of a control method of a processor according to an exemplary embodiment of the present invention.

Referring to FIG. 6, in response to processing of an interrupt routine being received, the processor may receive a first instruction of an ISR without backup of data stored in a register (S610). As described above, the processor may not backup data of the register during execution of the ISR. Accordingly, the processor may rapidly process the ISR.

The processor may analyze the input first instruction to determine whether the data stored in the register needs to be changed (S620). The processor may include a register flag. In response to ISR processing being requested, the processor may initialize a value of the register flag. For example, the processor may set the value of the register flag to 0. In addition, when the stored data is initially changed, the processor may change a value of the register flag. For example, the processor may set the value of the register to 1 during backup of the data of the register. In response to the value of the register flag being changed, the processor may determine that the data stored in the register is changed. Accordingly, when the value of the register flag to be used to process the input instruction is 1, the processor may not back up the data of the register. That is, when the data stored in the register is not changed or is not initially changed, the processor may not generate the second instruction. When the stored data is initially changed, the processor may generate the second instruction stored in a temporary memory (S630). The second instruction may be an instruction stored in the temporary memory. For example, the temporary memory may be a stack.

The processor may sequentially select the generated second instruction and first instruction (S640). In addition, the processor may perform the second instruction and the first instruction (S650). When backup of data is required, the processor may first process the second instruction for backing up data. Then, the processor may process the first instruction of the ISR. That is, the processor may store data in the temporary memory and then perform the first instruction.

When the ISR is terminated, the processor may restore data stored in the temporary memory to the register. The processor may include a plurality of registers. The processor may restore only data corresponding to a register, a value of register flag of which is changed, among a plurality of registers from the temporary memory.

The control methods of a processor according to the aforementioned various embodiments of the present invention may be embodied and provided in the form of a program.

For example, provided may be a non-transitory computer readable medium having restored thereon a program for performing receiving a first instruction of an ISR without backup of data stored in a register in response to processing of the ISR being requested, analyzing the received first instruction to determine whether the data stored in the register needs to be changed, generating a second instruction for storing data in a temporary memory when the stored data is initially changed, sequentially selecting the generated second instruction and first instruction, and performing the second instruction and the first instruction.

The non-transitory computer readable medium is a medium which does not store data temporarily such as a register, cash, and memory but stores data semi-permanently and is readable by devices. More specifically, the aforementioned applications or programs may be stored in the non-transitory computer readable media such as compact disks (CDs), digital video disks (DVDs), hard disks, Blu-ray disks, universal serial buses (USBs), memory cards, and read-only memory (ROM).

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A processor comprising:
an instruction fetch module configured to receive a first instruction of an interrupt service routine (ISR) without backup of data stored in a register in response to processing of the ISR being requested;
a detecting module configured to analyze the received first instruction of the ISR to perform an identification of whether the data stored in the register needs to be changed;
an instruction generating module configured to generate a second instruction for storing the data of the register in a temporary memory, in response to the identification that the data stored in the register is to be changed being made for a first time;
an instruction selecting module configured to sequentially select the generated second instruction and the first instruction of the ISR; and
a control module configured to perform the generated second instruction and the first instruction of the ISR.

2. The processor as claimed in claim 1, wherein the control module stores the data stored in the register in the temporary memory and then performs the first instruction of the ISR.

3. The processor as claimed in claim 1, wherein the control module restores the data of the register stored in the temporary memory to the register in response to the ISR being terminated.

4. The processor as claimed in claim 3, wherein the detecting module is further configured to initialize a value of a register flag in response to processing of the ISR being requested, and changes the value of the register flag, in response to the identification that the data stored in the register is to be changed being made for the first time.

5. The processor as claimed in claim 4, wherein the detecting module detects that the data stored in the register is changed, in response to the change of the value of the register flag.

6. The processor as claimed in claim 5, wherein the register is among a plurality of registers.

7. The processor as claimed in claim 6, wherein the control module restores only the data of a first register among the plurality of registers, from the temporary memory, to a second register from among the plurality of registers corresponding to a register flag, in response to a change of a value of the corresponding register flag.

8. The processor as claimed in claim 1, wherein the instruction generating module does not generate the second instruction, in response to the identification that the data stored in the register is not changed initially or is not changed.

9. A controlling method of a processor, the method comprising:
by the processor:
receiving a first instruction of an interrupt service routine (ISR) without backup of data stored in a register in response to processing of the ISR being requested;
analyzing the received first instruction of the ISR to perform an identification of whether the data stored in the register needs to be changed initially;
generating a second instruction for storing the data of the register in a temporary memory, in response to identification that the data stored in the register is to be changed being made for a first time;
sequentially selecting the generated second instruction and the first instruction of the ISR; and
performing the generated second instruction and the first instruction of the ISR.

10. The method as claimed in claim 9, wherein the performing comprises storing the data stored in the register in the temporary memory and then performing the first instruction of the ISR.

11. The method as claimed in claim 9, further comprising restoring the data of the register stored in the temporary memory to the register in response to the ISR being terminated.

12. The method as claimed in claim 11, wherein the identifying comprises initializing a value of a register flag in response to processing of the ISR being requested, and changing the value of the register flag, in response to the identification that the data stored in the register is to be changed being made for the first time.

13. The method as claimed in claim 12, wherein the identifying comprises detecting that the data stored in the register is changed, in response to the change of the value of the register flag.

14. The method as claimed in claim 13, wherein:
the register is among a plurality of registers; and
the restoring comprises restoring only data of a first register among the plurality of registers, from the temporary memory, to a second register from among the plurality of registers corresponding to a register flag, in response to a change of a value of the corresponding register flag.

15. The method as claimed in claim 9, wherein the generating comprises not generating the second instruction, in response to the identification that the data stored in the register is not changed initially or is not changed.

* * * * *